United States Patent
Wang

(10) Patent No.: US 8,180,848 B2
(45) Date of Patent: May 15, 2012

(54) APPARATUS AND METHOD FOR DISTRIBUTING VIDEO IMAGE TO A PLURALITY OF LIVE COMMUNICATION INTERFACES SIMULTANEOUSLY

(75) Inventor: Jen-Li Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1470 days.

(21) Appl. No.: 11/682,323

(22) Filed: Mar. 6, 2007

(65) Prior Publication Data
US 2007/0247516 A1    Oct. 25, 2007

(30) Foreign Application Priority Data
Apr. 25, 2006  (TW) ............................... 95114657 A

(51) Int. Cl.
*G06F 13/00* (2006.01)
(52) U.S. Cl. ..................................... 709/217
(58) Field of Classification Search .................. 709/217
See application file for complete search history.

(56) References Cited

U.S. PATENT DOCUMENTS
6,128,649 A * 10/2000 Smith et al. .................. 709/217
2006/0075054 A1 4/2006 Zhang et al.

OTHER PUBLICATIONS
Patrica, retrieved from website, meebo, Feb. 19, 2006, in http://patrica.pixnet.net/blog/post/675358.

* cited by examiner

*Primary Examiner* — Robert B Harrell
(74) *Attorney, Agent, or Firm* — Jianq Chyun IP Office

(57) ABSTRACT

An apparatus and a method for distributing video image are provided. The apparatus stores a video image captured by a video unit through a monitor module. When a plurality of communication interfaces are activated simultaneously, the video image previously stored in the monitor module is directly loaded into each communication interface through the monitor module, respectively. Therefore, the purpose of providing a plurality of communication interfaces with the video image simultaneously is achieved.

8 Claims, 3 Drawing Sheets

APPARATUS AND METHOD FOR DISTRIBUTING VIDEO IMAGE TO A PLURALITY OF LIVE COMMUNICATION INTERFACES SIMULTANEOUSLY

CROSS-REFERENCE TO RELATED APPLICATION

This application claims the priority benefit of Taiwan application serial no. 95114657, filed on Apr. 25, 2006. All disclosure of the Taiwan application is incorporated herein by reference.

BACKGROUND OF THE INVENTION

1. Field of the Invention

The present invention relates to an apparatus and a method for distributing video image. More particularly, the present invention relates to an apparatus and a method for distributing video image which are capable of providing a video image for a plurality of communication interfaces to use.

2. Description of Related Art

With the popularization of Internet, more and more users choose a live communication interface (such as MSN Messenger, Yahoo Messenger, and ICQ) as a bridge for communicating with others. As for the common live communication interfaces available in the market, in addition to the basic function of transmitting text messages, a video function has already been developed, which is achieved by using a video apparatus to capture the image of a user and transmitting the image to the another user in real-time through the Internet, thereby further reducing the distance between users.

However, due to the limitation of computer software/hardware, the above video apparatus can only be provided for a live communication interface at one time, so when the user activates a plurality of live communication interfaces simultaneously, only one live communication interface can use the video image provided by the video interface.

In order to provide the video image to a plurality of live communication interfaces simultaneously, the conventional method adds a virtual drive module to receive the video image from the video apparatus, and provides the video image for the plurality of communication interfaces which have been activated to use. FIG. 1 is a block diagram of the conventional apparatus for distributing video image. As shown in FIG. 1, the apparatus for distributing video image 100 includes a plurality of communication interfaces 101a-101n, a control system 102, a drive module 103, a video unit 104, a virtual drive module 105, and a display unit 106.

When the user activates a first communication interface 101a (e.g., the MSN Messenger) and a second communication interface 101b (e.g., the Yahoo Messenger), the control system 102 informs the drive module 103 to activate the video unit 104. When receiving the video image, the video unit 104 transmits the received video image to the control system 102 through the drive module 103. The control system 102 performs signal processing on the received video image, and then transmits the video image to the virtual drive module 105. Then, the video image is loaded into the first communication interface 101a and the second communication interface 101b through the virtual drive module 105, and is displayed by the display unit 106.

However, when each of the communication interfaces is activated, the drive module 103 and the virtual drive module 105 are activated simultaneously, and two video windows are generated at the same time. But, only the video window of the virtual drive module 105 can be displayed, while the video window of the drive module 103 is occupied by the control system 102 and cannot display. Since the video window corresponding to the drive module 103 is continuously activated, while using, the user must select the video window of the virtual drive module 105, instead of selecting the video window of the drive module 103, thereby causing inconvenience in operation of the user.

Furthermore, the control system 102 and the drive module 103 have different operation interfaces, and thus the video image can be transmitted only after the format is converted to the format such as direct X or VFW. When the control system 102 intends to transmit the video image to the virtual drive module 105, the signal processing must be performed again, and the repeated signal conversion occupies system process space and wastes plenty of time. Moreover, when using the virtual drive module 105, the video image must be retransmitted to the communication interface activated by the user after activating the virtual driving program with the CPU, and the repeated signal conversion increases the load of the system and wastes plenty of time.

SUMMARY OF THE INVENTION

Accordingly, the present invention is directed to an apparatus for distributing video image, which uses a monitor module to store a video image captured by a video unit, so as to achieve the purpose of providing a plurality of communication interfaces with the video function.

The present invention is also directed to a method for distributing video image, in which by storing the video image captured by a communication interface with the video function which has been activated, and providing the stored video image providing to other communication interface with the video function which has been activated simultaneously, it is not required to activate the signal processes of the virtual driving program and audio/video control software through the system, thereby reducing the system load and providing convenience for the user to operate.

As embodied and broadly described herein, the present invention provides an apparatus for distributing video image, which includes a plurality of communication interfaces, a video unit, a display unit, and a monitor module. The plurality of communication interfaces are suitable for respectively communicating with a plurality of external users, and the video unit is suitable for capturing a first video image. In addition, the display unit is suitable for displaying the first video image captured by the video unit, and the monitor module is coupled to each of the communication interfaces, the video unit, and the display unit, and is suitable for detecting whether there is another communication interface which has been activated when one of the plurality of communication interfaces is activated. If there is no communication interface which has been activated, the first video image captured by the video unit is stored, and provided to the display unit for display. On the contrary, if there is another communication interface which has been activated, the first video image previously stored in the monitor module is directly provided to the display unit for display.

The apparatus for distributing video image according to a preferred embodiment of the present invention further includes a receive interface coupled to each of the communication interfaces, and suitable for receiving a second video image of the plurality of external users and providing the second video image to each of the communication interfaces.

In the apparatus for distributing video image according to a preferred embodiment of the present invention, the display unit further includes displaying the second video image received by each of the communication interfaces.

The apparatus for distributing video image according to a preferred embodiment of the present invention further includes a drive module coupled to the video unit and the monitor module, and suitable for driving the video unit to capture the first video image, and the drive module includes a filter driver.

In the apparatus for distributing video image according to a preferred embodiment of the present invention, the monitor module includes a storage unit and a detection unit. The storage unit is suitable for storing the first video image captured by the video unit. The detection unit is suitable for detecting whether there is another communication interface which has been activated. If there is no communication interface which has been activated, the first video image captured by the video unit is stored in the storage unit, and provided to the display unit for display. Otherwise, if there is another communication interface which has been activated, the first video image stored in the storage unit is directly provided to the display unit for display.

From another point of view, the present invention provides a method for distributing video image, which is suitable for distributing a video function for a plurality of communication interfaces to use, and the method for distributing video image includes the following steps. First, one of a plurality of communication interfaces is activated. Then, it is determined whether there is another communication interface which has been activated. If there is no communication interface which has been activated, the video function is started and a video image is provided to the communication interface, and the video image is stored at the same time. Otherwise, if there is another communication interface which has been activated, the previously stored video image is directly provided to the other communication interface with the video function which has been activated.

In the method for distributing video image according to a preferred embodiment of the present invention, after the communication interface receives the video image, the method further includes displaying the video image.

In the apparatus and method for distributing video image, by storing the video image captured by the video unit with the monitor module, whenever a communication interface is activated, the stored video image can be provided to the communication interface, thereby achieving the purpose of providing the video image into a plurality of communication interfaces. Moreover, in the present invention, it is not required to activate the virtual driving program and convert the video image formats, and thus the system load can be reduced, thereby saving time and resource required by operation.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1:
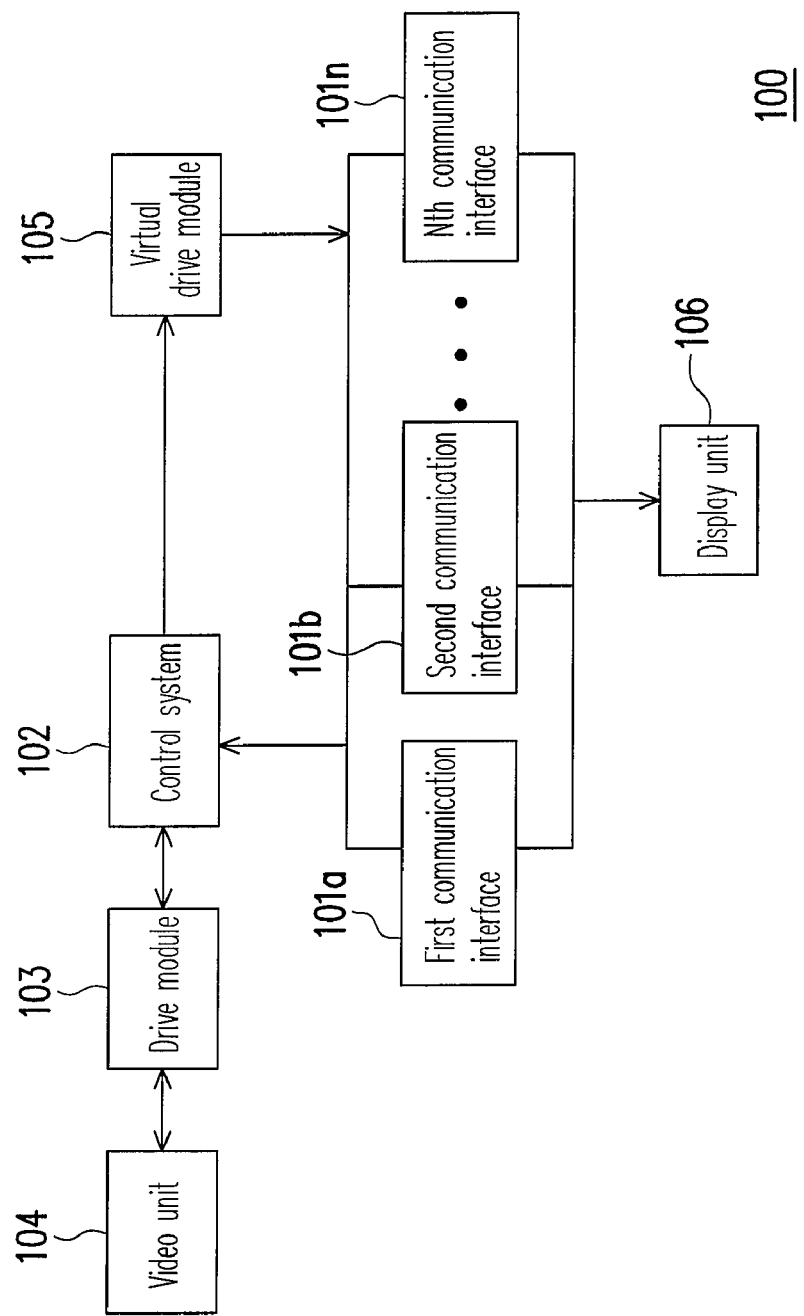
FIG. 1 is a block diagram of the conventional apparatus for distributing video image.
Figure 2:
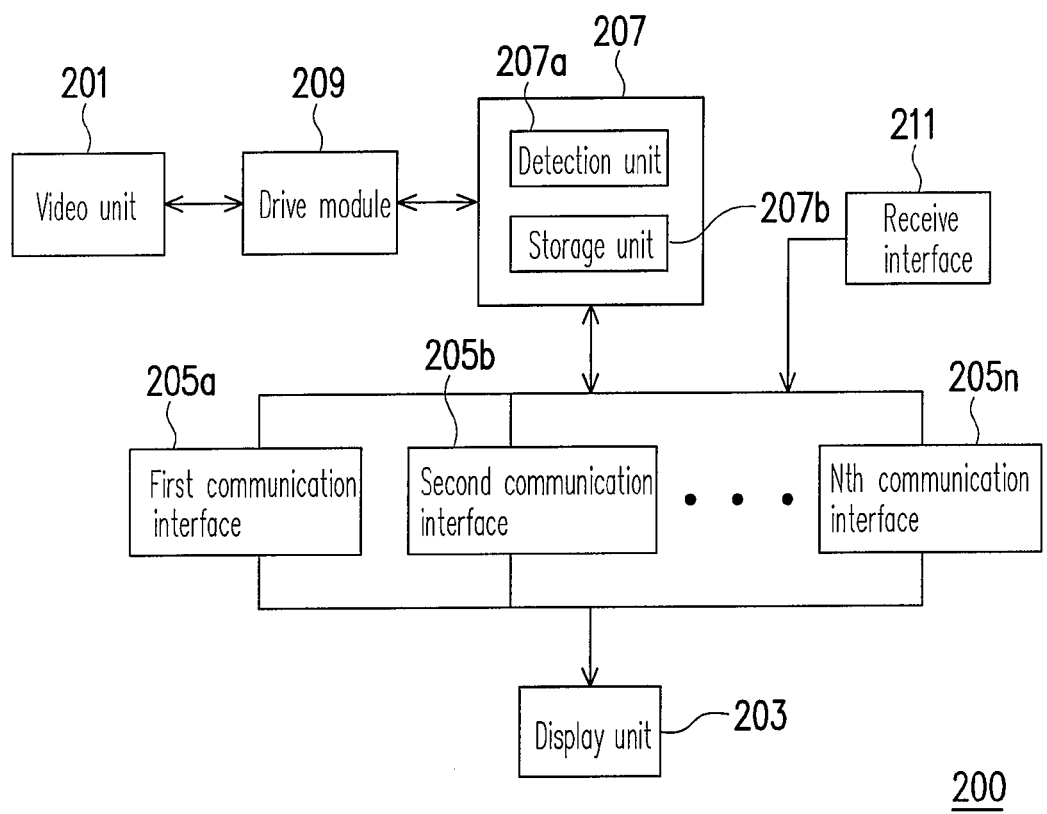
FIG. 2 is a block diagram of the apparatus for distributing video image according to a preferred embodiment of the present invention.

FIG. 2 is a block diagram of the apparatus for distributing video image according to a preferred embodiment of the present invention. Referring to FIG. 2, the apparatus for distributing video image 200 of this embodiment includes a video unit 201, a display unit 203, a plurality of communication interfaces 205a-205n, and a monitor module 207. The video unit 201 is used to capture a first video image, and the display unit 203 is used to display the first video image captured by the video unit 201.

The communication interfaces 205a-205n include, for example, communication interfaces of live communication software such as MSN Messenger, ICQ, and Yahoo Messenger, and are used to communicate with a plurality of external users respectively. The monitor module 207 is used to detect whether there is another communication interface which has been activated when one (e.g. a communication interface 205a) of the communication interfaces 205a-205n is activated.

If there is no other communication interface which has been activated, the monitor module 207 stores the first video image captured by the video unit 201, and the first video image is loaded into the communication interface 205a through the monitor module 207, and provided to the display unit 203 for display. Otherwise, if there is another communication interface (e.g., a communication interface 205b) which has been activated, the first video image previously stored by the monitor module 207 is loaded into the communication interface 205b, and provided to the display unit 203 for display.

In this embodiment, when the user activates the communication interface 205a, the detection unit 207a detects whether there is another communication interface which has been activated. If there is no other communication interface which has been activated, the monitor module 207 informs the drive module 209 to drive the video unit 201 to capture the first video image, and the first video image captured by the video unit 201 is stored in the storage unit 207b. Then, the first video image stored in the storage unit 207b and the second video image of the external users received by the receive interface 211 are loaded into the communication interface 205a, so as to be displayed by the display apparatus 203.

The monitor module 207 includes a detection unit 207a and a storage unit 207b. The detection unit 207a is used to detect whether there is another communication interface which has been activated when one (i.e., the communication interface 205a) of the communication interfaces 205a-205n is activated, and the storage unit 207b is used to store the first video image captured by the video unit 201.

In another preferred embodiment of the present invention, the apparatus for distributing video image 200 further includes a drive module 209 and a receive interface 211. The drive module 209 is used to drive the video unit 201 to capture the first video image, and can be implemented as, but is not limited to, a filter driver or hardware. The receive interface 211 is used to receive a second video image of the plurality of external users, and provide the second video image to each of the communication interfaces 205a-205n. Moreover, the second video image received by each of the communication interfaces 205a-205n can also be provided to the display unit 203 for display.

In this embodiment, when the user activates the communication interface 205a, the detection unit 207a detects whether there is another communication interface which has been activated. If there is no communication interface which has been activated, the monitor module 207 informs the drive module 209 to drive the video unit 201 to capture the first video image, and the first video image captured by the video unit 201 is stored in the storage unit 207b. Then, the first video image stored in the storage unit 207b and the second video image of the external users received by the receive interface 211 are loaded into the communication interface 205a, so as to be displayed by the display apparatus 203.

On the contrary, if one communication interface (e.g., the communication interface 205b) among the communication interfaces 205b-205n is activated, the first video image previously stored in the storage unit 207b and the second video image of the external users received by the receive interface 211 are loaded into the communication interface 205b, so as to be displayed by the display apparatus 203. Moreover, the first video image continuously captured by the video unit 201 is stored in the storage unit 207b synchronically, and then is provided to the activated communication interface for being used.

It can be known from the above that, no matter how many communication interfaces are activated by the user, when the first communication interface is activated, the storage unit 207b drives the video unit 201 to capture the first video image, and stores the first video image in the storage unit 207b. The first video image previously stored in the storage unit 207b can be directly loaded into the subsequently activated communication interface. In such a manner, a plurality of communication interfaces can use the video function simultaneously in the absence of any additional virtual drive module. Therefore, repeated signal processing is not required, thereby reducing the load of the system and increasing the transmission speed of the video image.

It should be further noted that, the present invention is not limited to only providing a plurality of communication interfaces to activate the video function. Under the circumstance of using the same communication interface to activate a plurality of windows, each window can also be distributed to use the video image simultaneously, thereby achieving the effect provided by the present invention as well.

In order to achieve the effect provided by the above apparatus for distributing video image, a method for distributing video image is further illustrated, which includes the operation processes of the apparatus for distributing video image whenever a communication interface is activated.

Figure 3:
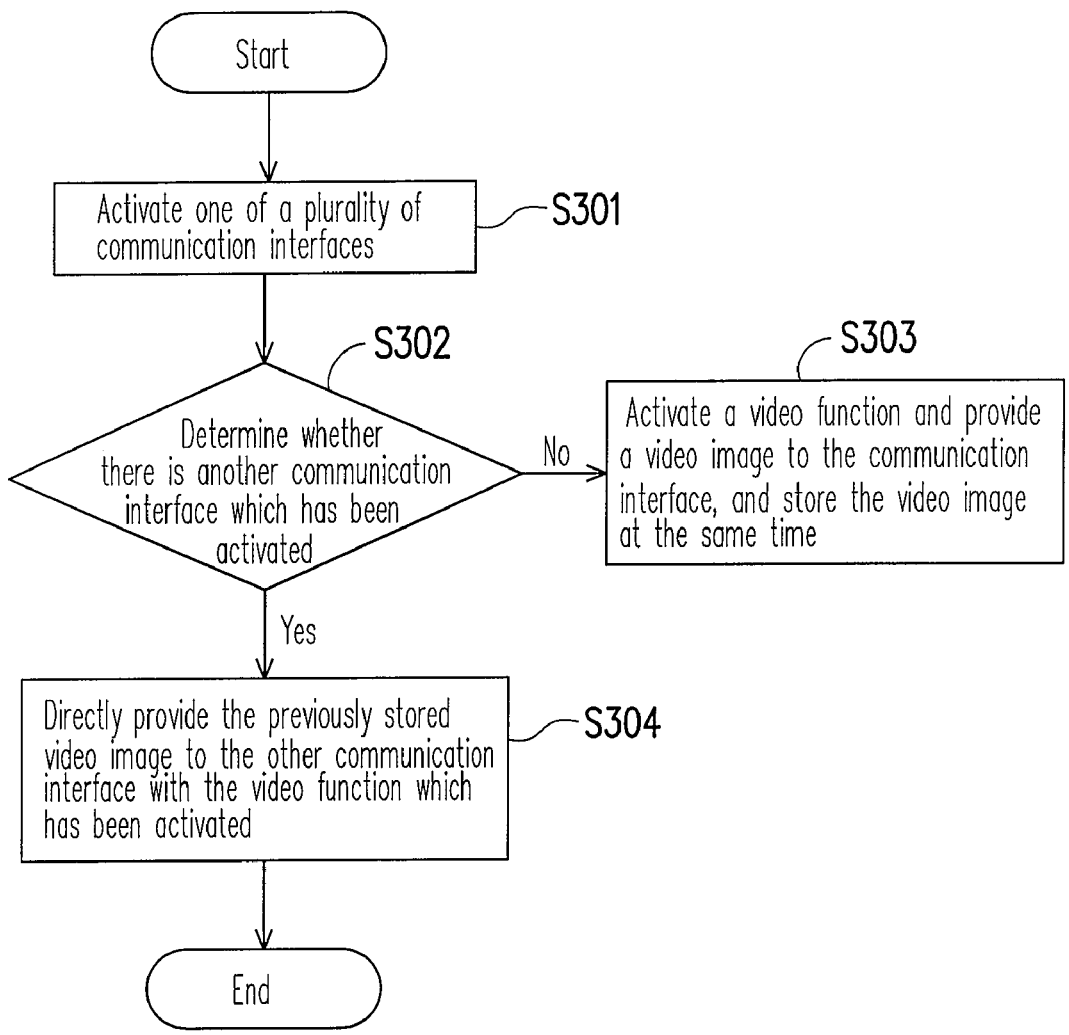
FIG. 3 is a flow chart of the method for distributing video image according to a preferred embodiment of the present invention.

FIG. 3 is a flow chart of the method for distributing video image according to a preferred embodiment of the present invention. The method for distributing video image is suitable for distributing a video image for a plurality of communication interfaces to use, and the method for distributing video image includes the following steps. First, in step S301, one of a plurality of communication interfaces is activated. The communication interfaces includes one of ICQ, MSN Messenger, and Yahoo Messenger.

Next, in step S302, it is determined whether there is another communication interface which has been activated. If there is no other communication interface which has been activated, entering step S303, a video function is activated and a video image is provided to the communication interface, and the video image is stored at the same time. Otherwise, if there is another communication interface which has been activated, entering step S304, the video image previously stored is directly provided to the other communication interface with the video function which has been activated.

In the method for distributing video image according to the preferred embodiment of the present invention, in step S303 and S304, after the communication interface receives the video image, the method further includes displaying the video image.

In view of the above, the present invention provides an apparatus and a method for distributing video image. According to the above embodiments, the present invention at least includes the following advantages.

1. The monitor module is used to store the video image which can be loaded into a plurality of communication interfaces, thereby achieving the purpose of making the plurality of communication interfaces use the video function simultaneously.

2. A repeated signal processing is avoided, and thus the load of the system is reduced, and the transmission speed of the video image is increased.

3. By the use of the control of the filter driver, additional hardware equipment is not required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for distributing video image, comprising:
a plurality of communication interfaces, suitable for communicating with a plurality of external users respectively;
a video unit, suitable for capturing a first video image;
a display unit, suitable for displaying the first video image; and
a monitor module, coupled to the communication interfaces, the video unit, and the display unit, suitable for detecting whether there is another communication interface which has been activated when one of the communication interfaces is activated, wherein if there is no other communication interface which has been activated, the first video image captured by the video unit is stored, and provided to the display unit for display; if there is another communication interface which has been activated, the first video image previously stored is directly provided to the display unit for display.

2. The apparatus for distributing video image as claimed in claim 1, further comprising:
a receive interface, coupled to the communication interfaces, suitable for receiving a second video image of the external users, and providing the second video image to the communication interfaces.

3. The apparatus for distributing video image as claimed in claim 2, wherein the display unit further comprises displaying the second video image received by the communication interfaces.

4. The apparatus for distributing video image as claimed in claim 1, further comprising:
a drive module, coupled to the video unit and the monitor module, suitable for driving the video unit to capture the first video image.

5. The apparatus for distributing video image as claimed in claim 4, wherein the drive module comprises a filter driver.

6. The apparatus for distributing video image as claimed in claim 1, wherein the monitor module comprises:
- a storage unit, suitable for storing the first video image captured by the video unit; and
- a detection unit, suitable for detecting whether there is another communication interface which has been activated, wherein if there is no other communication interface which has been activated, the first video image captured by the video unit is stored in the storage unit, and provided to the display unit for display; if there is another communication interface which has been activated, the first video image stored in the storage unit is directly provided to the display unit for display.

7. A method for distributing video image, suitable for distributing a video image for a plurality of communication interfaces to use, the distributing method comprising:

activating one of the communication interfaces;

determining whether there is another communication interface which has been activated;

if there is no other communication interface which has been activated, starting a video function and providing a video image to the communication interface, and storing the video image at the same time; and if there is another communication interface which has been activated, directly providing the video image previously stored to the communication interface.

8. The method for distributing video image as claimed in claim 7, after the communication interface receives the video image, the method further comprising:

displaying the video image.

* * * * *